United States Patent Office 3,380,054
Patented Apr. 23, 1968

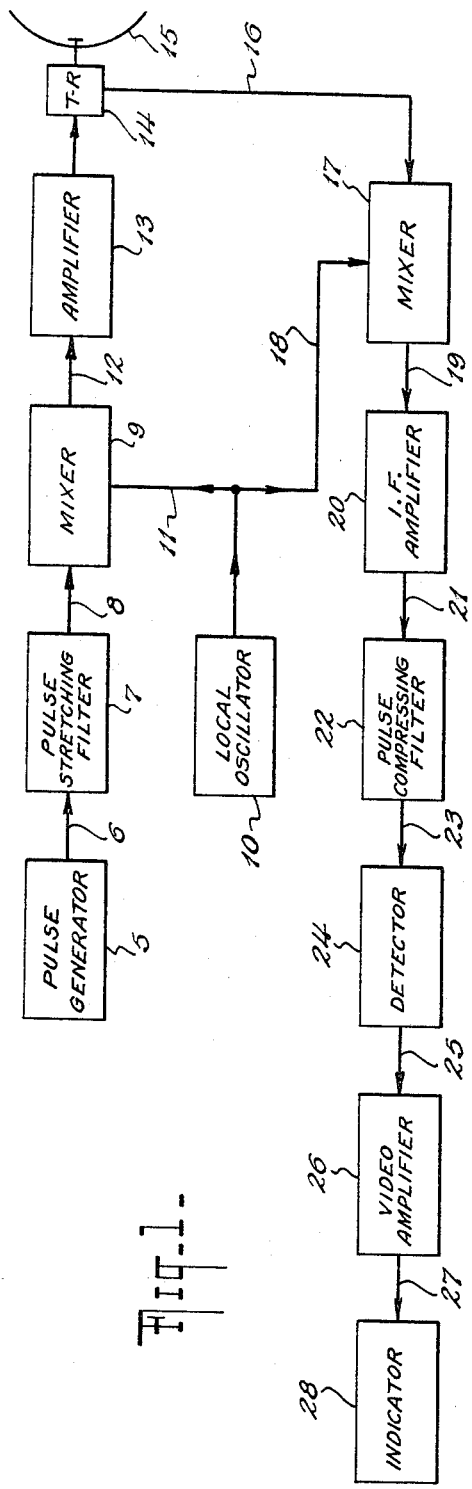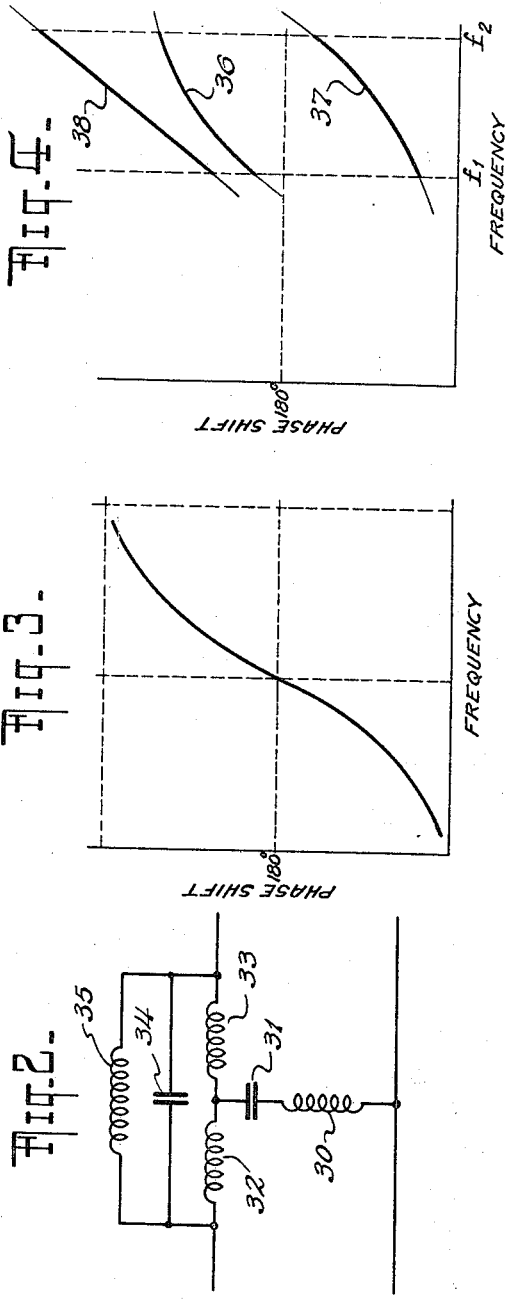

3,380,054
PULSE-TYPE RADAR SYSTEM
Charles E. Cook, Farmingdale, and Charles E. Brockner, Amityville, N.Y., assignors to Sperry Rand Corporation, a corporation of Delaware
Filed July 25, 1955, Ser. No. 524,054
7 Claims. (Cl. 343—17.2)

This invention relates to improvements in radar systems, and more specifically concerns a novel pulse-type radar system of large detection range and good target resolution.

One of a number of ever increasing demands on pulse-type radar system operation is to increase the detection range of the radar while maintaining a specified target resolution. This may be done by increasing the peak power transmitted. However, once the peak power limitation has been reached, nothing more may be done to increase the detection range except by increasing the average power by transmitting a wider pulse. This immediately violates the resolution specification, and cannot be done in an ordinary radar system.

A system adapted for transmitting a wider pulse while still retaining the same degree of range resolution is described in U.S. Patent No. 2,624,876 to R. H. Dicke. In the patented system, the wide pulse is generated directly by a high frequency generator, the carrier frequency of which is modulated by a frequency modulator. A pulse compression filter in the receiver transforms the received FM echo pulse into a pulse of much narrower width and greater amplitude. By this arrangement, individual target echo pulses that are superimposed in part as received are nevertheless caused to provide individual indications on the indicator.

The present invention concerns a system in some respects similar to the aforesaid patented arrangement, but in other important respects considerably different. More particularly, in the present system, a narrow unswept pulse, the envelope of which preferably contains many carrier cycles, is formed at a low power level in the transmitter and then transferred prior to amplification and radiation into a wide pulse by means of a pulse stretching filter. This transmitter filter phase shifts or delays the different frequency components over the spectrum of the narrow pulse by different amounts so that besides stretching the narrow pulse, it imparts a frequency swept characteristic thereto. Thus, the transmitter filter passively provides a frequency-modulated wide pulse from a fixed carrier narrow pulse. The received echoes, which consequently are also frequency-modulated wide pulses, are compressed by a pulse compression filter into narrow pulses for indication purposes; however, the pulse compression filter employed is such as to provide a time delay which when added to the time delay of the pulse stretching filter results in an overall flat, or constant, time delay. Since a flat time delay is a requirement for non-distorted pulse transmission, and since such a delay results in the present system from the provision of transmitter and receiver filters that have the requisite cooperative relationship, the narrow pulse that enters the transmitter filter is reproduced at the output of the receiver filter.

A principal object of the present invention is to provide an improved radar system having both a large detection range and good target resolution.

Another object is the provision in the transmitter portion of a radar system of a pulse stretching filter having a time delay which when added to the time delay of a pulse compressing filter in the receiver portion of the system results in an overall flat, or constant, filter-induced time delay.

Another object is to provide in the transmitter portion of a radar system a pulse stretching filter for passively producing from a narrow pulse of fixed carrier frequency a frequency-modulated wider pulse for transmission purposes, the pulse stretching filter being complementary to a pulse compressing filter in the receiver portion of the system so that the pulse compressing filter produces from the received pulse a narrow pulse matching the pulse input to the pulse stretching filter.

With the foregoing and other objects in view, the present invention includes the novel elements and combinations and arrangements thereof described below and illustrated in the accompanying drawings, in which:

FIG. 1 is a block diagram of the present system;

FIG. 2 is a schematic representation of a preferred filter configuration for pulse stretching and compressing according to the present invention;

FIG. 3 is a generalized plot of the type of frequency vs. phase-shift characteristic obtainable from the filter configuration depicted in FIG. 2; and FIG. 4 shows the relation of respective frequency vs. phase-shift plots for the filters of FIG. 1 that results in an overall constant filter-induced time delay.

Referring to FIG. 1, a pulse generator 5, preferably comprising a continuous wave intermediate frequency oscillator which is pulsed by gate voltage supplied by means such as a suitably triggered blocking oscillator, generates a series of low power narrow pulses at a fixed carrier frequency and rich in harmonic content. The narrow pulses are fed via a connection 6 to a filter 7 which is designed to have a longer time delay for the low frequency components of the narrow pulses than for the high frequency components thereof. This results in pulse outputs from filter 7 which are wider than its pulse inputs and of lower amplitude. Thus, filter 7 may be termed a pulse stretching filter. In addition, each pulse in passing through filter 7 is thereby tailored to have a frequency-swept characteristic. That is to say, the highest frequency within the envelope of the pulse output of filter 7 will be at the beginning of such pulse output and the frequencies will be progressively lower toward the end of the pulse output, the carrier frequency being centrally located of such output.

Since a narrow pulse of the nature described characteristically has an energy-predominant range or spectrum of harmonices centered around its carrier frequency, e.g., 3 mc. on either side of a 30 mc. intermediate frequency carrier, the pulse output of filter 7 is essentially swept, as a practical matter, through said spectrum.

The relatively wide and passively frequency-modulated pulses are then fed from filter 7 via a connection 8 to a mixer 9. A local oscillator 10 supplies a second input to mixer 9 via a connection 11, which input comprises continuous wave oscillations which serve to increase all of the incremental intermediate frequencies in the band of the frequency-modulated pulse output of filter 7 by a fixed amount for radiation purposes without changing the bandwidth itself.

The frequency-modulated pulses of increased frequency level are fed from mixer 9 via a connection 12 to an amplifier 13 for amplification to a high power level, thence through a transmit-receive switch 14 to a directional antenna 15 which radiates the high-energy content pulses in a directional beam. Amplifier 13 is preferably controlled by gating means synchronized with pulse generator 5 to be operative only during such times that pulses are fed to the amplifier from mixer 9. Transmit-receive switch 14 connects amplifier 13 to antenna 15 while pulses appear in the amplifier's output and simultaneously disconnects the receiver portion of the radar system from the antenna. In the interval between transmitted pulses and while echo pulses are being received, transmit-receive switch 14 connects antenna 10 to the receiver portion and simultaneously disconnects the antenna from amplifier 13 in the transmitter portion of the system.

The returning echo-pulses which are likewise relatively wide are applied from antenna 15 through transmit-receive switch 14 and a connection 16 to a mixer 17. Local oscillator 10 supplies a second input to mixer 17 via a connection 18, which input comprises the same continuous wave oscillations that are fed to mixer 9 in the transmitter portion. The beat frequency output of mixer 17 consists of frequency modulated echo pulses, the frequency level of which is reduced to the intermediate frequency level of the pulses fed via connection 8 to mixer 9.

The output of mixer 17 is fed via a connection 19 to an intermediate frequency amplifier 20, the output of which is then fed via a connection 21 to a filter 22. Filter 22 is the converse of filter 7 in that it delays the high frequencies more than the low frequencies in such a manner as to compress the relatively wide, frequency modulated pulses it receives into replicas of the the narrow pulses originally generated by pulse generator 5.

While thus far filter 7 has been described as delaying the low frequency carrier components more than the high frequency components, and filter 22 as delaying the highs more than the lows, the arrangement may actually be vice versa. If such is the case, there will be no change whatever in performance, except that the passive frequency modulation will be from a low frequency to a high frequency instead of from a high frequency to a low frequency.

From pulse compression filter 22, the narrow or compressed echo pulses are fed via a connection 23 to a detector 24 which transforms the pulse output of filter 22 into video pulses. A connection 25 feeds the video pulses from detector 24 to a video amplifier 26, the output of which is fed via a connection 27 to an indicator 28. Indicator 28 may include a cathode ray tube adapted to respond to the amplified video pulses so as to indicate targets detected by the radar system.

In accordance with the present invention, the over-all or total time delay resulting from the individual time delays of filters 7, 22 is constant. That is to say, the sum of the phase shifts produced by the individual filters for the different frequencies within the swept frequency band of the transmitted and received pulses produces an over-all linear phase shift vs. frequency characteristic. On the other hand, the individual phase shift vs. frequency characteristic of each filter is not necessarily linear.

FIG. 2 depicts a preferred configuration for both filter 7 and filter 22, respectively shown in block form in FIG. 1. The configuration illustrated is that of a double bridged-T all pass filter network. An inductance element 30 and a capacitance element 31 form the stem portion of the T, while inductance elements 32, 33 form the bar portion with a capacitance element 34 and an inductance element 35 separately bridged over both the elements 32, 33. In order to limit the sizes of the element 30-35 to practical magnitude and also achieve desirable amounts of stretching and compressing, each of the filters 7, 22 may be formed of a number of cascaded sections like FIG. 2.

The all pass filter network of FIG. 2 has a slanted S-shaped frequency vs. phase shift characteristic curve as shown in a general manner in FIG. 3. The inflection point of the curve occurs at the frequency which is phase-shifted 180°, so that the curve is concave upward for phase shifts less than 180° and concave downward for phase shifts greater than 180°. The approaches of the respective ends of the curve to 0° and 360° phase shift intercepts are theoretically asymptotic, but concave portions of substantial slope are readily obtained over practical frequency bands.

Since the slope of the concave upward portion of the curve (FIG. 3) increases with increasing frequency, the time delay produced by the filter will be greater for the higher frequencies up to the inflection point frequency than for the lower frequencies. And since the slope of the concave downward portion of the curve decreases with increasing frequency, the time delay will be greater for the lower frequencies beyond the inflection point frequency than for the higher frequencies.

It will become apparent by reference to FIG. 4 that one of the filters 7, 22 (FIG. 1) may be obtained by assigning parameters to the preferred filter configuration (FIG. 2) of such values that most of the concave downward portion 36 of the filter's phase shift vs. frequency curve is made to include the spectrum or predominant frequency band of the narrow pulses, $f_1$ to $f_2$, whereby the filter delays the lower frequencies in the band more than the higher frequencies. The other of the filters 7, 22 is then obtained by assigning parameters to the configuration of FIG. 2 of such values that a corresponding amount of the concave upward portion 37 of the filter's phase shift vs. frequency curve is made to include the predominant frequency band, whereby such other filter delays the higher frequencies in the band more than the lower frequencies. Thus obtained, filters 7 and 22 complement each other to produce an overall flat, or constant, time delay, as indicated by the constant slope or linearity of the summation 38 of the phase shift vs. frequency segments 36, 37.

The complementary filter system of FIG. 1 is well suited for the application of moving target indicator (MTI) radar techniques. In this connection, the CW oscillator that is preferably included in pulse generator 5, need only be of high stability or coherence, as would also be required of local oscillator 10. The narrow receiver pulse in connection 23 may then be compared with the output of the stable CW oscillator included in pulse generator 5 to determine the phase difference of the two signals. A variation of this phase difference from pulse to pulse will provide an indication of a moving target. In other words, the local oscillator 10 in terms of the MTI art, becomes the STALO (Stable Local Oscillator) and the CW oscillator included in pulse generator 5 becomes the COHO (Coherent Oscillator). Since the overall action of the two complementary filters 7, 22 is to provide a linear phase shift, the only effect it will have on MTI operation will be to add a fixed phase shift at the carrier frequency, which is to say that it will in no way hinder MTI operation. The complementary filters, being passive elements, will not introduce any short term variations or jitter in the phase shift. Consequently, MTI radar techniques may readily be applied to the present system by reason of the greater stability that may be attained relative to that attainable when electronic frequency-modulation is employed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse-type radar system having transmitter and receiver portions, said system comprising a source of fixed carrier frequency pulses in said transmitter portion, a pulse stretching filter coupled to said source for passively frequency-modulating said pulses prior to their transmission, and a pulse compressing filter in said receiver portion for transforming echo pulses into fixed carrier frequency pulses substantially identical to those pulses initially provided by said source.

2. The system of claim 1 wherein both of the filters are of an all-pass double bridged-T configuration.

3. In combination, means for generating periodic pulses of electrical energy having a fixed carrier frequency, said periodic pulses having the major portion of their energy confined to a preselected frequency band centered about said fixed carrier frequency, first filter means having a phase shift vs. frequency characteristic of positive slope, means for applying said periodic pulses to said first filter means to obtain therefrom passively frequency-modulated pulses of longer duration, second filter means having a phase shift vs. frequency characteristic of positive slope, and transmission path means for applying to said second filter means said passively frequency-modulated pulses of longer duration, said slope of one of said first and second filter means changing in an increasing sense over said preselected frequency band and said slope of the other of said first and second filter means changing in a decreasing sense over said preselected frequency band, said slopes having their respective changes so related that the total time delay provided by said first and second filters taken together is constant over said preselected frequency band, whereby the pulses produced in the output of said second filter are substantially identical to said periodic pulses applied to said first filter.

4. In combination, means for generating periodic pulses of electrical energy having a fixed carrier frequency, said periodic pulses having a major portion of their energy confined to a preselected frequency band centered about said fixed carrier frequency, first all-pass filter means, means for applying said fixed carrier pulses to said first filter means to obtain therefrom passively frequency-modulated pulses of longer duration, second all-pass filter means, and transmission path means for applying to said second filter means said passively frequency-modulated pulses of longer duration, one of said first and second filter means providing a phase shift that increases non-linearly with frequency over said preselected frequency band at a rate that changes in a decreasing sense and the other of said first and second filter means providing a phase shift that increases non-linearly with frequency over said preselected frequency band at a rate that changes in an increasing sense, said changing rates of the respective phase shift increases of said first and second filters being such that the total time delay of said filters is constant over said preselected frequency band, whereby the pulses produced in the output of said second filter are substantially identical to said fixed carrier pulses.

5. A radar system comprising means for generating periodic pulses of electrical energy having a fixed carrier frequency of intermediate value, said pulses having a major portion of their energy confined to a selected band of intermediate frequencies centered about said carrier frequency, first filter means coupled to said pulse generating means for delaying the different frequency components in said pulses by different amounts in a manner so as to increase the duration of said pulses and impart a frequency swept characteristic thereto over said selected frequency band, first heterodyning means for raising the intermediate frequency band of the pulse output of said first filter means to a radio frequency band of equal bandwidth, means for transmitting the pulse output of said first heterodyning means toward a target, means for receiving target-returned pulses, second heterodyning means for lowering the radio frequency band of said target-returned pulses to said intermediate frequency band, second filter means coupled to said second heterodyning means for compressing the output pulses of said second heterodyning means into pulses substantially identical to the pulses fed to said first filter means, and a pulse-responsive indicator coupled to the output of said second filter means.

6. A radar system of the pulse transmission type comprising a source of periodic pulses of electrical energy having a fixed carrier frequency and a given predominant frequency spectrum centered about said carrier frequency, a pulse stretching filter coupled to said source for increasing the duration of each of said periodic pulses by progressively phase shifting the different frequency components therein by respectively different amounts, whereby to passively transform said periodic pulses into frequency-modulated pulses swept from one end of said frequency spectrum to the other end of said spectrum, means coupled to said pulse stretching filter for transmitting the output pulses thereof toward a reflecting object, means for receiving pulses reflected from said object, and a pulse compressing filter coupled to said receiving means for decreasing the duration of each of said reflected pulses by progressively phase shifting the different frequency components of said reflected pulses by respectively different amounts, the respective progressive phase shifting of said filters being so related that one of said filters delays higher frequencies more than lower frequencies while the other of said filters delays lower frequencies more than higher frequencies and said filters together produce an overall constant time delay over said frequency spectrum.

7. A radar system comprising a source of short duration pulses of radio frequency waves, a first filter having a transfer characteristic whose phase response is a function of frequency for extending the durations of said short duration pulses, a transmitter coupled to said filter for amplifying said extended pulses and transmitting the same, means for receiving an echo of said transmitted pulses, a second filter having a transfer characteristic which is inverse to that of said first filter coupled to the output of said receiving means for shortening the durations of said received pulses, and means coupled to said source and to the output of said second filter for comparing the initial short pulses and the shortened received pulses.

References Cited
UNITED STATES PATENTS

| | | | |
|---|---|---|---|
| 2,624,876 | 1/1953 | Dicke | 343—13 |
| 2,718,622 | 9/1955 | Harkless | 333—75 X |
| 2,823,375 | 2/1958 | Camp | 343—13 |
| 2,678,997 | 5/1954 | Darlington | 343—17.1 |
| 2,753,448 | 7/1956 | Rines | 250—6.45 |

RODNEY D. BENNETT, *Primary Examiner.*

NORMAN H. EVANS, FREDERICK M. STRADER, CHESTER L. JUSTUS, *Examiners.*

R. A. KUYPERS, G. J. MOSSINGHOFF, C. L. WHITHAM, *Assistant Examiners.*